(12) United States Patent
Hattori

(10) Patent No.: US 8,571,341 B2
(45) Date of Patent: Oct. 29, 2013

(54) IMAGE PROCESSING APPARATUS, CONTROL METHOD, AND PROGRAM

(75) Inventor: Mitsuaki Hattori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1179 days.

(21) Appl. No.: 12/479,807

(22) Filed: Jun. 7, 2009

(65) Prior Publication Data

US 2009/0304301 A1 Dec. 10, 2009

(30) Foreign Application Priority Data

Jun. 10, 2008 (JP) ................. 2008-151867

(51) Int. Cl.
*G06K 9/40* (2006.01)
*G06K 9/36* (2006.01)

(52) U.S. Cl.
USPC ............................ 382/254; 382/275; 382/286

(58) Field of Classification Search
None
See application file for complete search history.

(56) References Cited

U.S. PATENT DOCUMENTS

| | | | | |
|---|---|---|---|---|
| 4,736,399 A * | 4/1988 | Okazaki | ...................... | 378/98.2 |
| 5,031,049 A * | 7/1991 | Toyama et al. | ................ | 348/352 |
| 5,196,929 A * | 3/1993 | Miyasaka | ..................... | 348/169 |
| 5,434,621 A * | 7/1995 | Yu | ................... | 348/347 |
| 5,436,979 A * | 7/1995 | Gray et al. | ..................... | 382/141 |
| 5,512,951 A * | 4/1996 | Torii | .............................. | 348/353 |
| 5,537,180 A * | 7/1996 | Matsumoto et al. | ............ | 396/52 |
| 5,555,047 A * | 9/1996 | Tsuji et al. | ..................... | 396/319 |
| 5,615,278 A * | 3/1997 | Matsumoto | ................... | 382/128 |
| 5,619,264 A * | 4/1997 | Yoshimura et al. | ........... | 348/352 |
| 5,675,380 A * | 10/1997 | Florent et al. | ................. | 348/251 |
| 5,745,175 A * | 4/1998 | Anderson | ...................... | 348/345 |
| 5,818,527 A * | 10/1998 | Yamaguchi et al. | .......... | 348/335 |
| 6,005,609 A * | 12/1999 | Cheong | ......................... | 348/169 |
| 6,140,649 A * | 10/2000 | Lonn | ........................ | 250/363.04 |
| 6,295,386 B1 * | 9/2001 | Ryu | ............................. | 382/294 |
| 6,388,732 B1 * | 5/2002 | Williams et al. | ................ | 355/40 |
| 6,549,680 B1 * | 4/2003 | Revankar | ...................... | 382/289 |
| 6,724,935 B1 * | 4/2004 | Sawada et al. | ................ | 382/167 |
| 6,792,161 B1 * | 9/2004 | Imaizumi et al. | ............. | 382/275 |
| 6,798,921 B2 * | 9/2004 | Kinjo | ............................ | 382/282 |
| 6,937,282 B1 * | 8/2005 | Some et al. | ..................... | 348/335 |
| 6,940,550 B2 * | 9/2005 | Kitawaki et al. | .............. | 348/246 |
| 6,944,267 B2 * | 9/2005 | Suzuki | ......................... | 378/98.8 |
| 7,058,236 B2 * | 6/2006 | Ohashi | .......................... | 382/275 |
| 7,119,926 B2 * | 10/2006 | Takeda et al. | ................... | 358/1.9 |
| 7,206,461 B2 * | 4/2007 | Steinberg et al. | ............. | 382/274 |
| 7,218,425 B2 * | 5/2007 | Saida et al. | .................... | 358/437 |
| 7,340,109 B2 * | 3/2008 | Steinberg et al. | ............. | 382/275 |
| 7,355,744 B2 * | 4/2008 | Hattori | ........................... | 358/1.2 |
| 7,418,127 B2 * | 8/2008 | Watanabe et al. | ............. | 382/154 |
| 7,499,082 B2 * | 3/2009 | Iga | ............................. | 348/222.1 |
| 7,532,234 B2 * | 5/2009 | Sadovsky et al. | .......... | 348/207.1 |
| 7,535,501 B1 * | 5/2009 | Loushin et al. | ............... | 348/246 |

(Continued)

FOREIGN PATENT DOCUMENTS

JP 2000-125178 A 4/2000

*Primary Examiner* — Manav Seth

(74) *Attorney, Agent, or Firm* — Canon U.S.A., Inc. IP Division

(57) ABSTRACT

An image processing apparatus includes a reading unit configured to read an image and information about a target portion recorded along with the image, a correction unit configured to correct distortion occurring in the image, and a recording control unit configured to re-record the information about the target portion which has been changed according to a distortion correction amount performed on the image by the correction unit.

16 Claims, 9 Drawing Sheets

(56) References Cited

U.S. PATENT DOCUMENTS

| | | | |
|---|---|---|---|
| 7,576,794 B2 * | 8/2009 | Silverbrook | 348/345 |
| 7,643,696 B2 * | 1/2010 | Kita | 382/260 |
| 7,659,921 B2 * | 2/2010 | Aoyama | 348/135 |
| 7,701,491 B2 * | 4/2010 | Abe et al. | 348/240.2 |
| 7,751,066 B2 * | 7/2010 | Iwasaki | 356/610 |
| 7,760,962 B2 * | 7/2010 | Sambongi et al. | 382/274 |
| 7,817,210 B2 * | 10/2010 | Ikeda et al. | 348/671 |
| 7,856,145 B2 * | 12/2010 | Ando et al. | 382/190 |
| 7,932,493 B2 * | 4/2011 | Harada et al. | 250/306 |
| 7,961,356 B2 * | 6/2011 | Shin | 358/3.21 |
| 8,049,786 B2 * | 11/2011 | Pan et al. | 348/218.1 |
| 8,064,690 B2 * | 11/2011 | Suzuki | 382/162 |
| 8,077,249 B2 * | 12/2011 | Huang | 348/345 |
| 8,077,909 B2 * | 12/2011 | Watanabe et al. | 382/100 |
| 8,131,064 B2 * | 3/2012 | Mashitani et al. | 382/154 |
| 8,155,432 B2 * | 4/2012 | Ueno | 382/154 |
| 8,228,396 B2 * | 7/2012 | Hagiwara | 348/222.1 |
| 8,244,057 B2 * | 8/2012 | Lin et al. | 382/275 |
| 2003/0030686 A1 * | 2/2003 | Abe et al. | 347/16 |
| 2004/0114189 A1 * | 6/2004 | Kaku et al. | 358/3.26 |
| 2004/0240749 A1 * | 12/2004 | Miwa et al. | 382/274 |
| 2005/0062856 A1 * | 3/2005 | Matsushita | 348/222.1 |
| 2005/0219403 A1 * | 10/2005 | Hyodo | 348/349 |
| 2006/0008173 A1 * | 1/2006 | Matsugu et al. | 382/274 |
| 2006/0238622 A1 * | 10/2006 | Shimosato | 348/220.1 |
| 2007/0115364 A1 * | 5/2007 | Kumaki | 348/208.99 |
| 2008/0158612 A1 * | 7/2008 | Iwasaki | 358/3.26 |
| 2009/0039278 A1 * | 2/2009 | Petrick et al. | 250/370.11 |
| 2010/0053365 A1 * | 3/2010 | Abe et al. | 348/222.1 |

\* cited by examiner

_(2 column patent page)_

IMAGE PROCESSING APPARATUS, CONTROL METHOD, AND PROGRAM

BACKGROUND OF THE INVENTION

1. Field of the Invention

The present invention relates to an image processing apparatus having a function for correcting distortion of an image, a control method, and a program.

2. Description of the Related Art

There is known a function of recognizably displaying, when playing back an image captured by an imaging apparatus using the imaging apparatus or an image processing application software program for a personal computer (PC), an autofocus (AF) frame that was selected from among a plurality of AF frames during an AF operation of the imaging apparatus. There is also known, as discussed in Japanese Patent Application Laid-Open No. 2000-125178, a function of automatically enlarging and displaying the position of an AF frame selected during the AF operation to facilitate confirmation of a focusing state of the captured image using an image processing apparatus or an image processing application software program for a PC.

As described above, to facilitate confirmation of the focusing state of an image captured by the imaging apparatus, conventionally, position information of the AF frame selected during the AF operation is recorded in the image, and during playback of the image, the position of the selected AF frame is displayed or displayed and enlarged on a display unit of the imaging apparatus.

On the other hand, in an image captured by the imaging apparatus, distortion can occur due to the effects of an optical system including a focus lens and a zoom lens. Commercially-available countermeasures against such distortion include an imaging apparatus or an image processing application software program for a PC that is provided with a function for correcting distortion using image processing of the captured image.

However, if this countermeasure is combined with the above-described conventional function, there are the following problems.

When distortion correction is performed on a captured image, the position of an object photographed as the image is shifted compared with before correction. As a result, if the position of the AF frame with respect to the image which has undergone distortion correction is displayed or enlarged and displayed using directly the position information of the AF frame recorded before the distortion correction is performed, a shifted position from the actual AF frame position may be displayed or enlarged and displayed. The details of this will be described with reference to FIG. 10.

FIG. 10 illustrates an example of display of an AF frame during playback of a barrel type distortion image.

FIG. 10 illustrates an example in which, when playing back and displaying a barrel type distortion image 1000 captured by an imaging apparatus, the position of an AF frame 1002 is displayed on a display unit of an imaging apparatus to facilitate focusing confirmation. In FIG. 10, the dotted line 1001 represents an example of image distortion. Typical examples of distortion include the barrel type distortion illustrated in FIG. 10 and the pin-cushion type distortion illustrated in the below-described FIG. 11.

The seven square frames illustrated in FIG. 10 are the AF frames which can be selected during image capture. The imaging apparatus selects any one, or a plurality, of these seven AF frames, and performs AF so as to adjust the focus on an object which is located at the position of the selected AF frame(s). Further, among the seven square frames, the square frame indicated by a bold line is the AF frame 1002 selected as where the main object is present. FIG. 10 illustrates a state in which the AF frame 1002 where a main object 1003 is present is selected. The imaging apparatus records the position information of these AF frames in the image during image capture of the image. Further, using the position information during playback of the image, the imaging apparatus displays the position of the seven selectable AF frames and the position of the AF frame 1002 selected to be used in focus adjustment.

FIG. 11 illustrates an example of display of an AF frame during playback of a pin-cushion type distortion image.

In FIG. 11, the dotted line 1100 represents an example of a pin-cushion type distortion image when an image captured by the imaging apparatus is played back.

FIG. 12 illustrates a problem in the conventional art when distortion correction is performed on a barrel type distortion image.

FIG. 12 includes an image 1200 which has undergone barrel type distortion correction. By performing correction, the image size is made slightly larger than the pre-correction image 1001 in FIG. 10. Further, the dotted line 1201 indicates that the image 1001 (barrel type distortion) is corrected. The image 1200 includes a main object 1203 obtained by performing distortion correction on the main object 1003 illustrated in FIG. 10.

The seven square frames illustrated in FIG. 12 are displayed on the playback image 1200, which has undergone distortion correction, using the position information of the AF frames recorded in the image 1000. Further, among the seven square frames, the square frame indicated by a bold line is the AF frame 1202 selected as where the main object is present. If the position information of the AF frame recorded in the image is used directly and displayed on the playback image, the position of the main object 1203 is shifted with respect to the position of the pre-correction main object 1003. As a result, the position that is shifted from the post-correction main object 1203 is indicated as the AF frame 1202.

How the AF frame 1202 is shifted with respect to the main object 1203 depends on how the position information of the AF frame is recorded in the image. FIG. 12 illustrates a case where the position of the AF frame is recorded using coordinates with the center of the image as the origin. Similarly, if the position of the AF frame is recorded using coordinates with the upper left corner of the image as the origin, for example, as illustrated in FIG. 13, the AF frame is displayed as being shifted to the upper left.

FIG. 14 illustrates a problem in the conventional art when distortion correction is performed on a pin-cushion type distortion image.

In FIG. 14, when distortion correction is performed on the pin-cushion type distortion image, the image becomes slightly smaller than before correction. Similar to barrel type distortion, if the position information of the AF frame recorded in the image during image capture is used directly, and the position of the AF frame is displayed on the image which has undergone distortion correction, the position 1402 of the AF frame is displayed at a position that is shifted from a main object 1403.

SUMMARY OF THE INVENTION

The present invention is directed to an image processing apparatus and an image processing method in which, when an image whose distortion is corrected is played back and displayed such that the position of a target portion of the image can be viewed or an object located at the target portion can be enlarged and displayed, a display position of the target position can be aligned with the corrected image.

According to an aspect of the present invention, an apparatus includes a reading unit configured to read an image and information about a target portion recorded along with the image, a correction unit configured to correct distortion occurring in the image, and a recording control unit configured to re-record the information about the target portion which has been changed according to a distortion correction amount performed by the correction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
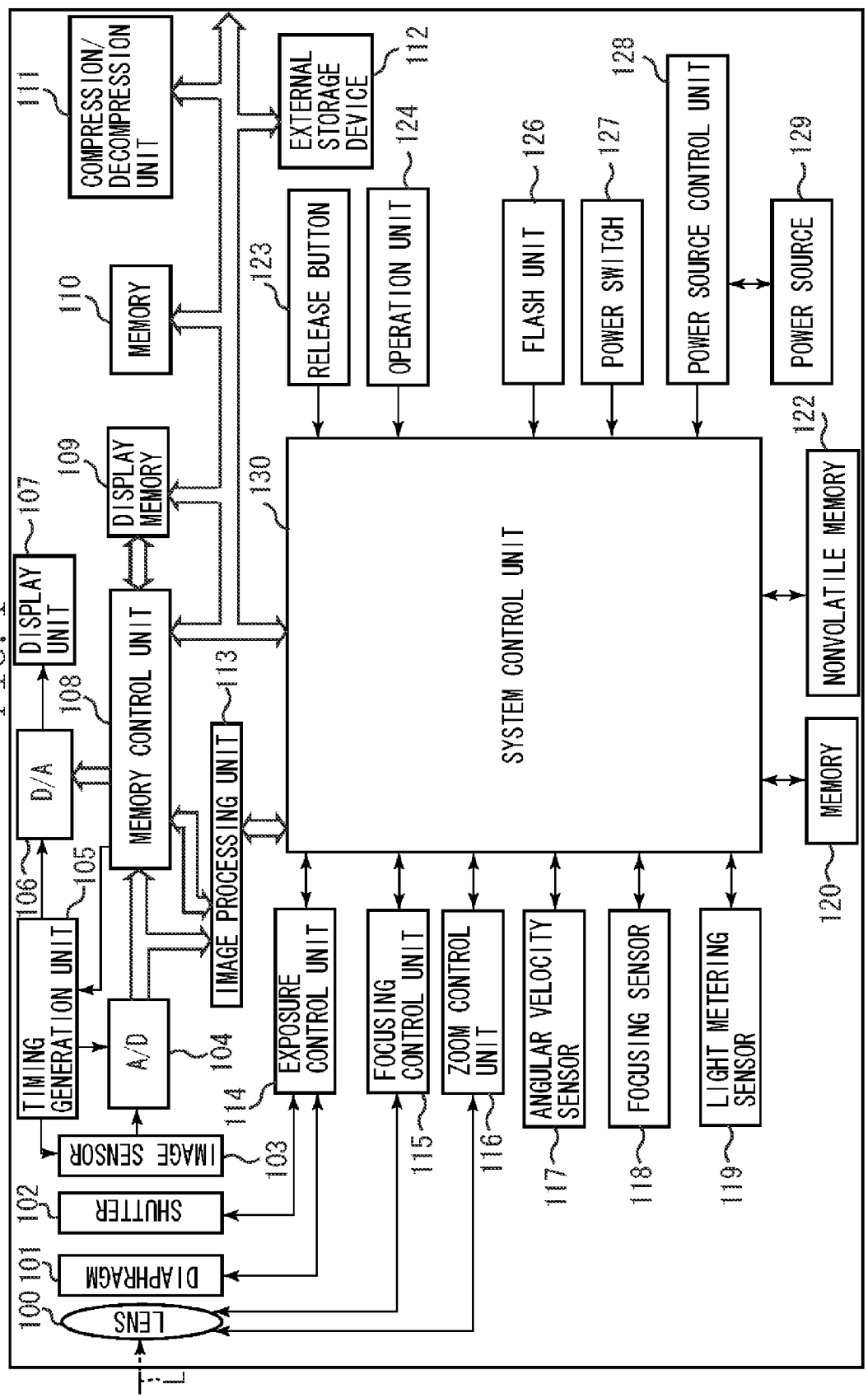
FIG. 1 is a block diagram illustrating a configuration example of an imaging apparatus serving as an image processing apparatus according to a first exemplary embodiment of the present invention.

FIG. 1 is a block diagram illustrating a configuration example of an imaging apparatus serving as an image processing apparatus according to a first exemplary embodiment of the present invention.

In FIG. 1, the imaging apparatus is configured as a digital still camera, which includes an imaging lens 100, a diaphragm 101, a shutter 102, an image sensor 103, a display unit 107, an image processing unit 113, a memory 120, a system control unit 130, and the like.

During image capture, an optical image of light L which passed through the imaging lens 100, which includes a zoom lens and a focus lens, is formed. The image sensor 103 converts the optical image into an electric signal. An A/D converter 104 converts an analog signal output from the image sensor 103 into a digital signal. A timing generation unit 105 is controlled by a memory control unit 108 and the system control unit 130. The timing generation unit 105 supplies a clock signal and a control signal to the image sensor 103, the A/D converter 104, and a D/A converter 106, and controls the operations of these units.

The image processing unit 113 performs predetermined pixel interpolation processing, color conversion processing, and below-described face detection processing on data from the A/D converter 104 or data from the memory control unit 108. The image processing unit 113 also performs predetermined calculation processing using the captured image data, and based on the obtained calculation results, performs through the lens (TTL) type AWB (Auto White Balance) processing.

The memory control unit 108 controls the A/D converter 104, the timing generation unit 105, the image processing unit 113, an image display memory 109, the D/A converter 106, a memory 110, and a compression/decompression unit 111. As a result, digital data that has undergone A/D conversion by the A/D converter 104 is written into the image display memory 109 or the memory 110 via the image processing unit 113 and the memory control unit 108, or directly via the memory control unit 108.

The display unit 107 is configured by a thin film transistor (TFT), a liquid crystal display (LCD), and the like. The image display memory 109 stores image data displayed on the display unit 107. The image data stored in the image display memory 109 is displayed via the D/A converter 106 on the display unit 107. Further, various menus (an image processing menu for optical distortion correction processing, a white balance selection menu etc.) for controlling the imaging apparatus are displayed on the display unit 107. The display and selection of these menus are performed responsive to an operator operating an operation unit 124.

The memory 110 is used to store captured still image data, which has a sufficient storage capacity to store a predetermined amount of still image data. Further, the memory 110 can be used as a work region for the system control unit 130 and the image processing unit 113. The compression/decompression unit 111 reads the image data stored in the memory 110 and performs compression processing, or reads compressed image data and performs decompression processing. The compression/decompression unit 111 writes the processed image data into the memory 110.

An external storage device 112 is a storage medium which can be detached from the imaging apparatus. Examples which may be used include a CompactFlash® (CF) card and a secure digital (SD) card. Image data temporarily recorded in the memory 110 is eventually stored in the external storage device 112. The image processing unit 113 performs image processing, such as image white balance processing, color correction processing, face detection processing, distortion correction processing, detection processing of dust adhered to the image sensor 103, processing for making dust unnoticeable, and the like. The face detection processing detects a face region of person(s) who are included in the image. The distortion correction processing corrects, using image processing, distortion caused by the effects of the imaging optical system.

A light metering sensor 119 measures the luminance of each pixel which is conjugatively associated with the image plane. When an appropriate amount of exposure is calculated by the system control unit 130 based on an output of the light metering sensor 119, the exposure control unit 114 controls the diaphragm 101 and the shutter 102 based on the amount of exposure. A focusing sensor 118 detects distance information of an AF frame that is arbitrarily selected by the operator. A focusing control unit 115 controls focusing of the imaging lens 100 based on the output from the focusing sensor 118. In addition to being arbitrarily selected by the operator, the AF frame may also be set to automatically focus on the closest object based on the detection by the focusing sensor 118.

A zoom control unit 116 detects an amount of zooming (focal length) of the imaging lens 100 operated manually by the operator. Further, when the zooming of the imaging lens 100 is instructed by the operator using the operation unit 124, the zoom control unit 116 controls the amount of zooming of the imaging lens 100. An automatic flash unit 126 has an AF auxiliary light projecting function and a flash light amount control function. An angular velocity sensor 117 detects vibration of the imaging apparatus in the horizontal and vertical directions. This detection result is used in camera-shake correction processing and in determination of portrait or landscape orientation.

The system control unit 130 controls the operations of the imaging apparatus, and executes the processing illustrated in the respective flowcharts described below based on a program. A memory 120 stores programs, including constant and variable programs for operation of the system control unit 130, image processing parameters and the like. The memory 120 may also be used as a work memory. A nonvolatile memory 122 is capable of electrically erasing and recording data. For example, an electrically erasable and programmable read only memory (EEPROM) can be used.

A release button 123 is used to input various operation instructions into the system control unit 130. The release button 123 includes an SW1 and SW2 two-stage switch. SW1 is turned ON by a first stroke of the release button 123, which starts light metering and focusing. SW2 is turned ON by a second stroke of the release button 123, which starts an exposure operation.

A power source switch 127 is operable to turn the main power source of the imaging apparatus ON and OFF. A power source control unit 128 includes a battery detection unit, a DC-DC converter, a switch unit for switching a block to be energized and the like. The power source control unit 128 detects whether a battery is mounted, the type of battery, and the remaining amount of battery.

Next, various processing steps of the imaging apparatus according to the present exemplary embodiment having the above-described configuration will be described. First, the processing for performing distortion correction on an image captured by the imaging apparatus will be described with reference to FIGS. 2 to 5.

Figure 2:
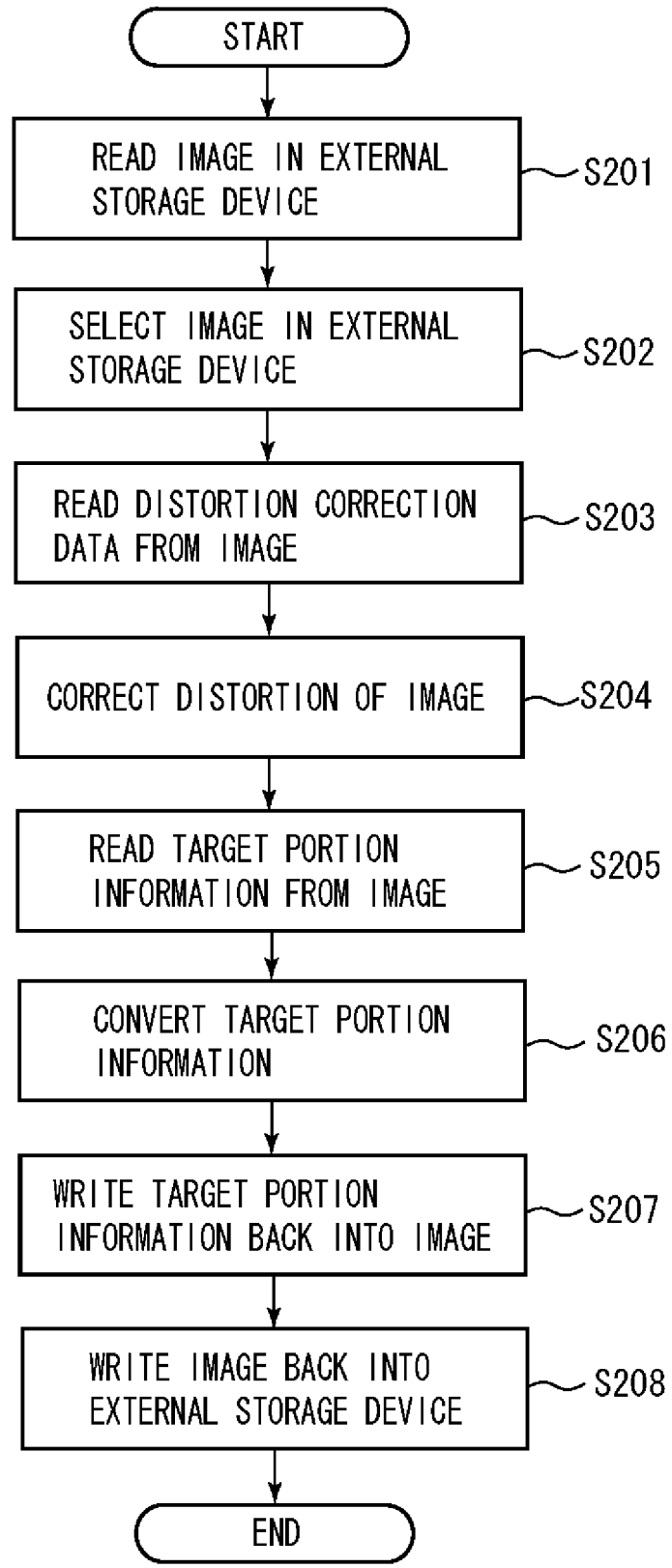
FIG. 2 is a flowchart illustrating a processing flow of distortion correction processing of an image captured by the imaging apparatus.

FIG. 2 is a flowchart illustrating a processing flow of distortion correction processing of an image captured by the imaging apparatus.

In step S201, when the distortion correction processing is selected by the operator from the various processing menus displayed on the display unit 107, the system control unit 130 reads an image stored in the external storage device 112 into the image display memory 109. In the read image, position information of a plurality of AF frames which could be selected during image capture, and position information of the AF frame which was selected from among those AF frames to be used in focus adjustment during image capture are stored in an image header portion of the image data. Further, the system control unit 130 displays the image read into the image display memory 109 on the display unit 107. An image to be displayed on the display unit 107 can be switched responsive to the operator operating the operation unit 124.

When an image switching instruction is issued from the operation unit 124 by the operator, the system control unit 130 again reads another image from the external storage device 112 into the image display memory 109, and displays this image on the display unit 107. In step S202, when the image that is to undergo distortion correction is selected by the operator using the operation unit 124 from among the images displayed on the display unit 107, the system control unit 130 detects the selection of the target image on which distortion correction is to be performed.

When the target image on which distortion correction is to be performed is selected, then in step S203, the system control unit 130 reads, from the image, distortion correction data, which is stored along with the image. Examples of distortion correction data include the number of horizontal pixels/number of vertical pixels of the image, the center coordinates of the image, the pixel interval of the image sensor 103 used in capturing the image (hereinafter, "pixel pitch"), the type of imaging lens 100, the focal length of the imaging lens 100 during image capture, and the like.

In the present exemplary embodiment, during image capture by the imaging apparatus, the respective numerical values of the distortion correction data corresponding to the image capture conditions are recorded in the image header portion of the image data. Further, in the present exemplary embodiment, in the image data, a region for recording color (R, G, B) image information is called an "image content portion", and other regions for recording distortion correction data and the like are called an "image header portion".

Figure 3:
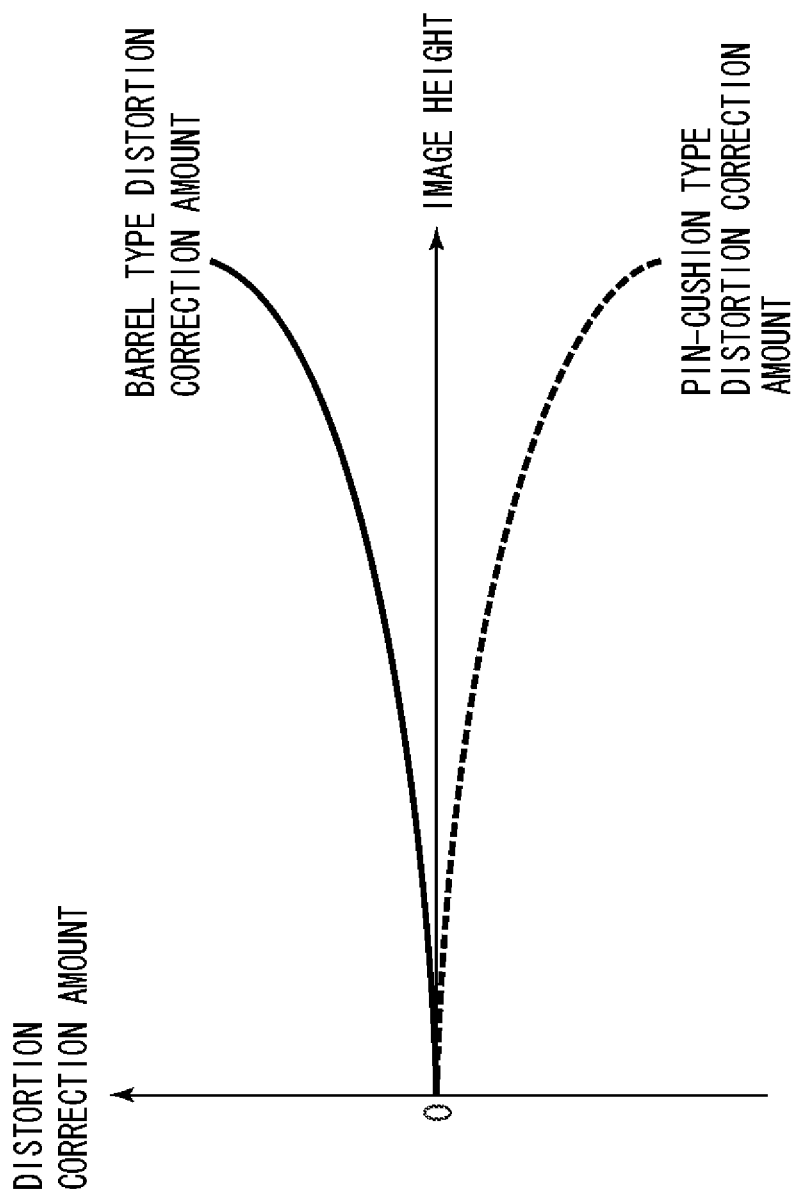
FIG. 3 illustrates a simplified distortion correction amount with respect to image height.

Next, in step S204, the system control unit 130 corrects the distortion of the image using the distortion correction data read in step S203 from the target image on which distortion correction is to be performed. An exemplary method of the distortion correction will be described below. FIG. 3 illustrates the characteristics of a simplified distortion correction amount with respect to image height (distance from the center of an image sensor to a target point of the optical image formed on the image sensor). In FIG. 3, the solid line represents a barrel type distortion correction amount, and the dotted line represents a pin-cushion type distortion correction amount. The coordinate position of each of the pixels constituting the image is changed along with the correction amount illustrated in FIG. 3. The system control unit 130 moves the coordinate position of the image so that the image height increases the larger the distortion correction amount on the vertical axis in FIG. 3 is in the positive direction, and moves the coordinate position of the image closer to the center of the image sensor the larger the distortion correction amount is in the negative direction. Namely, for barrel type distortion, by performing distortion correction, the higher the image height position of the pixel, the further the pixel moves away from the center of the image sensor. Conversely, for pin-cushion type distortion, by performing distortion correction, the higher the image height of the pixel, the closer the pixel moves toward the center of the image sensor.

For example, if the coordinates of a pre-correction given pixel "a" of an image in which the center of the image is the origin are (Xa, Ya), the coordinates after the distortion correction are (Xa×γ, Ya×γ). Here, γ is the distortion correction amount of the image height corresponding to coordinates (Xa, Ya). The center coordinates of the image can be determined using the image center coordinates of the distortion correction data read from the image, or by calculating the center pixel from the number of horizontal pixels/number of vertical pixels of the image.

The center coordinates of the image are the coordinates of the center position of the exposed region of the image sensor 103. The center position of the image subjected to image processing and stored in the external storage device 112 in JPEG format or the like generally matches the center position of the exposed region of the image sensor 103. However, because images in the commonly-known RAW format may be recorded as far as a region which is beyond the exposed region of the image sensor 103, in such situations the center position of the image in the region excluding the region beyond the exposed region has to be calculated.

If a pixel is formed which lacks information as a result of the above distortion correction, for example, such information is interpolated using a bilinear method or the like from each of the R, G, B channels of an adjacent pixel. Thus, to correct distortion, the image height of the correction target pixel needs to be calculated. The image height corresponding to each pixel can be calculated by the following expression (1).

$$h=(Xa^2+Ya^2)^{0.5} \times p \quad (1)$$

Here, Xa, Ya, h, and p are as follows:

Xa=Horizontal direction coordinate of a pre-correction given pixel "a" of an image in which the center of the image is the origin (number of pixels in the horizontal direction from the center of the image).

Ya=Vertical direction coordinate of a pre-correction given pixel "a" of an image in which the center of the image is the origin (number of pixels in the vertical direction from the center of the image).

h=Image height corresponding to the coordinates (Xa, Ya).

p=Pixel pitch of the distortion correction data read from the image.

In the present exemplary embodiment, the distortion correction amount is illustrated in the graph of FIG. 3. In actual practice, data obtained by forming the graph of FIG. 3 as a table or data calculated from the graph of FIG. 3 using an approximation method is recorded in a device for correcting the distortion (in the present exemplary embodiment, the system control unit 130). When correcting the distortion, that data is read to perform correction.

In addition, since in actual practice the distortion correction table depends on the type of imaging lens, the focal length and the like, the correction value for each imaging lens and focal length are to be recorded in the device for correcting distortion (in the present exemplary embodiment, the system control unit 130). The type of imaging lens and the focal length are read beforehand as described above from the image as distortion correction data.

Referring back to FIG. 2, in step S205, the system control unit 130 reads target portion (AF frame) information (information about the target portion) from the image which has undergone the distortion correction in step S204. Examples of the target portion (AF frame) information include the position, size, and shape of a selectable AF frame, the position, size, and shape of a face (including the eyes, nose, mouth, etc.) of a target detected in the face detection processing, and the position, size, and shape of the selected AF frame. The system control unit 130 reads at least any one of these pieces of information as target portion information.

Next, in step S206, the system control unit 130 converts the target portion (AF frame) information into the distortion correction amount. The method for converting the target portion information will now be described in more detail.

Figure 10:
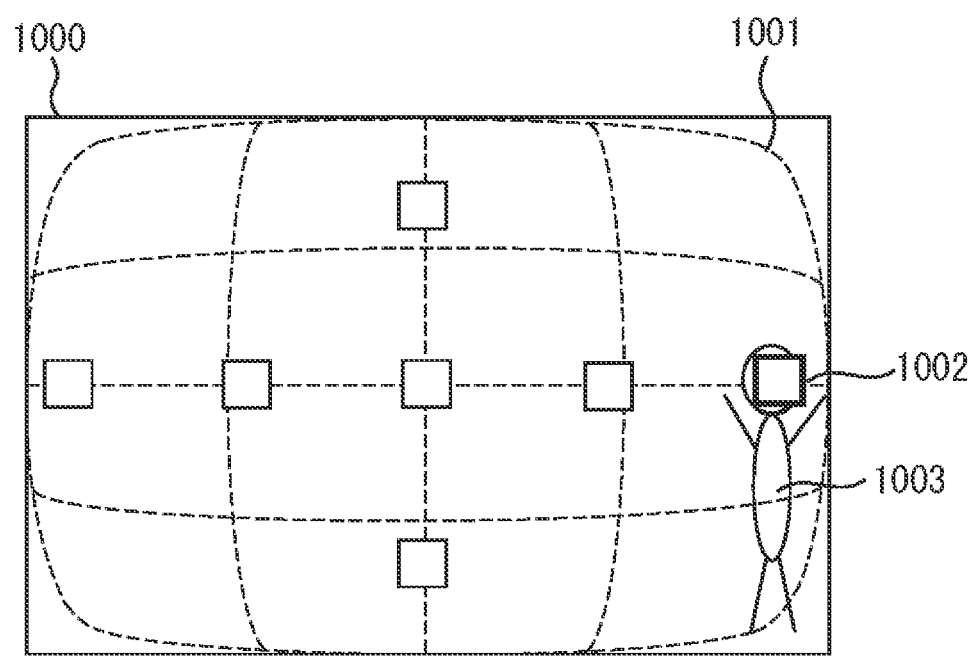
FIG. 10 illustrates an example of display of an AF frame during playback of a barrel type distortion image.
Figure 11:
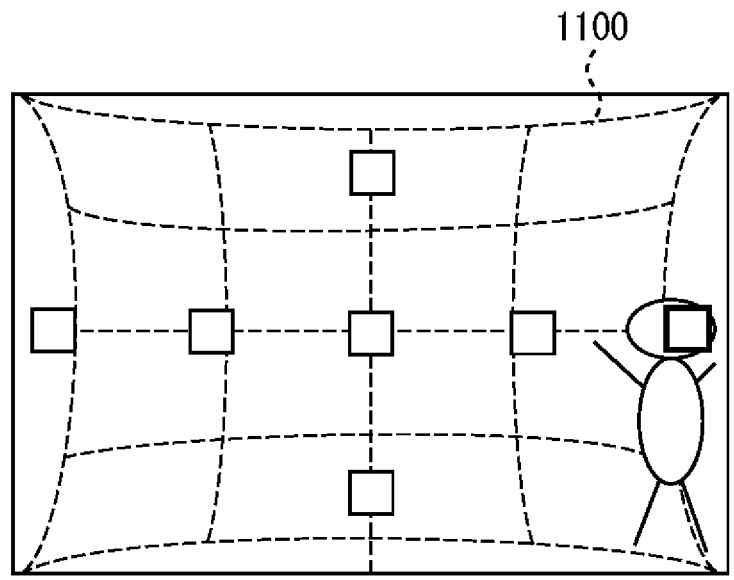
FIG. 11 illustrates an example of display of an AF frame during playback of a pin-cushion type distortion image.
Figure 12:
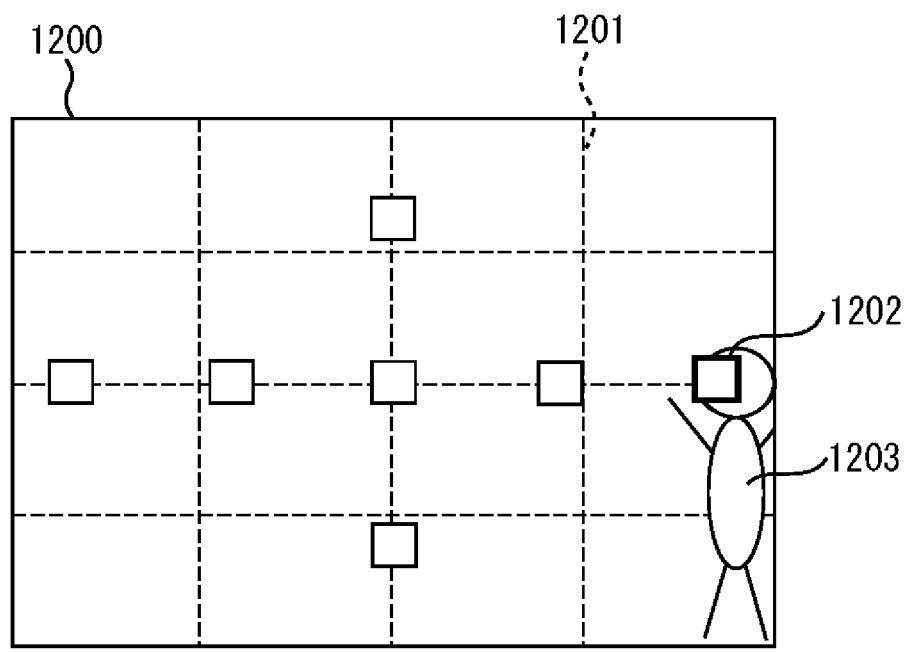
FIG. 12 illustrates a problem in the conventional art when distortion correction is performed on a barrel type distortion image.
Figure 13:
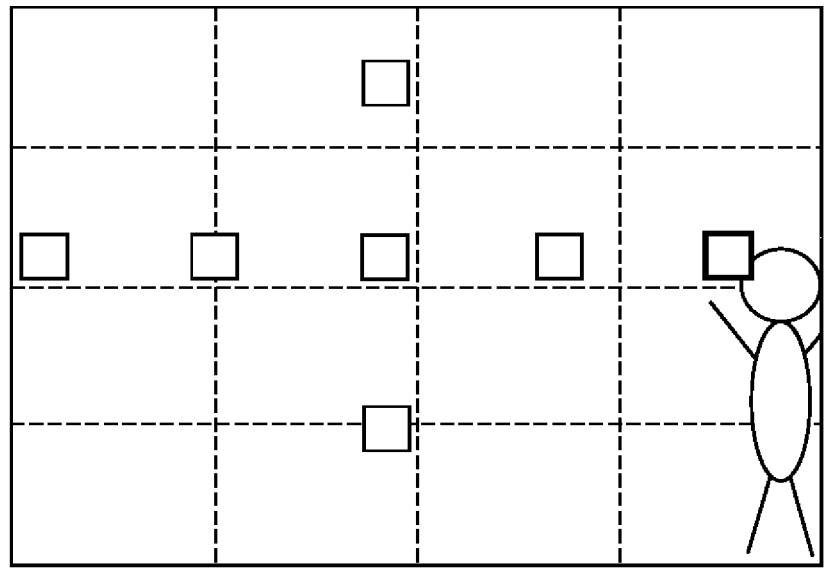
FIG. 13 illustrates a problem in the conventional art when distortion correction is performed on a barrel type distortion image.
Figure 14:
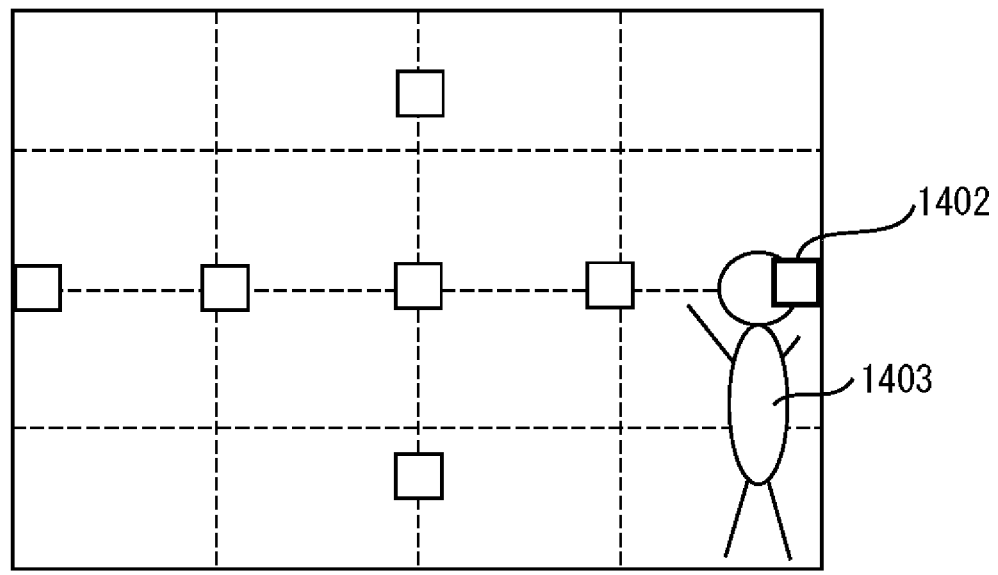
FIG. 14 illustrates a problem in the conventional art when distortion correction is performed on a pin-cushion type distortion image.

First, a case where the target portion information is the "position, size, and shape of a selectable AF frame" (a selectable AF frame displayed on the display unit) will be described. The AF frame is displayed as a square (quadrangle) as illustrated in FIG. 10. The coordinates corresponding to the positions in the image of the four vertexes of the square are recorded beforehand in the image header portion during image capture in such a manner that the position of the square, the size (region) of the frame of the square, and the shape can be understood.

In the present exemplary embodiment, the above-described coordinates use the center of the image as the origin. Obviously, the origin is not limited to the center of the image. An arbitrary origin may be used. For example, the origin may be the upper left corner of the image. Further, while the AF frame is represented as a shape formed from the four vertexes of the square, the AF frame may be represented as a shape formed by an arbitrary one vertex of the four vertexes of the square and the lengths of the four sides. In addition, the AF frame is not limited to a square. The AF frame may be some other shape, such as a rectangle.

In the present exemplary embodiment, as illustrated in FIG. 10, since the number of AF frames which can be selected by the imaging apparatus is set at seven, the target portion information has the coordinate information of the four vertexes of the squares for seven AF frames. Obviously, the number of AF frames is not limited to seven.

The system control unit 130 pre-records the thus-defined AF frame information in the image header portion of the image data during image capture, and reads this AF frame information in step S205. The system control unit 130 converts each of the coordinates of the four vertexes of the squares of each AF frame using the same method as the method for performing the distortion correction on the image. By performing this processing, the AF frame corresponding to the correct image position can be displayed even when an image that has undergone distortion correction is subsequently displayed along with the AF frame position.

By converting the coordinates, the square displayed shape of the AF frame may become shaped like a diamond or a trapezoid. In such a case, while the diamond or trapezoid shape can be recorded directly, if it is desired to display the AF frame as a square shape during the subsequent image playback, the AF frame information can also be recorded by converting the coordinates into a square frame that fits in the inner side or the outer side of the diamond or trapezoid.

Figure 4:
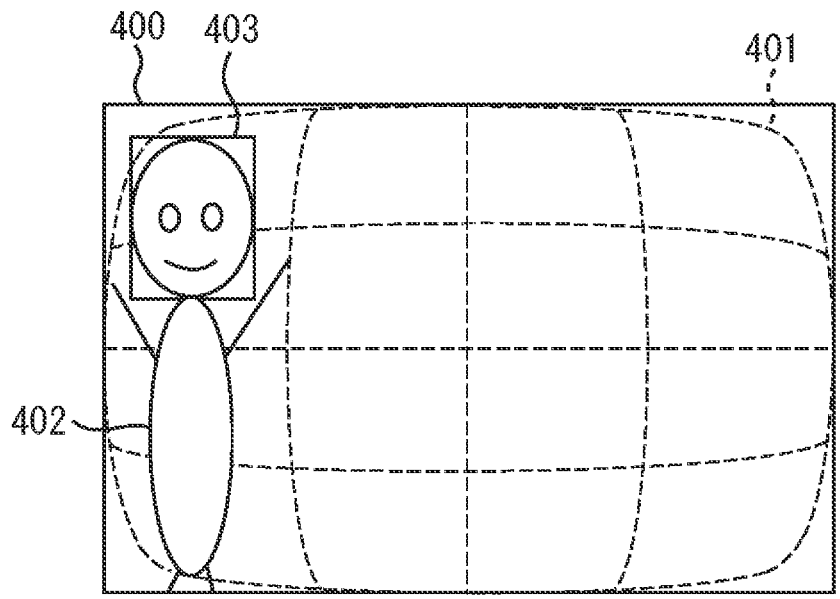
FIG. 4 illustrates an example of display of the position of a face detected by face detection processing in a barrel type distortion image.

Next, a case where the target portion information is the "position, size (region), and shape of a face detected in the face detection processing" will be described. The system control unit 130 detects the position, size, and shape of a face (including the eyes, nose, mouth, etc.) from the image by face detection processing during or after the imaging, and records the detected information in the image header portion of the image data. FIG. 4 illustrates an example of display of the position of a face detected by face detection processing in a barrel type distortion image. FIG. 4 includes a pre-correction barrel type distortion image 400, an example of a barrel type distortion image 401, an object (person) 402, and a face frame 403, which is a face detected in the face detection processing.

In the present exemplary embodiment, while a configuration in which the frame of the face detected in the face detection processing is displayed as a quadrangle is given as an example, a shape other than a quadrangle may be used as long as the position, size (region), and shape of the face (eyes, nose, mouth, facial profile, etc.) can be detected. In such a case, information on the position, size, shape, and the like for the eyes, nose, mouth, facial profile and the like, or for at least one of those, needs to be recorded in the image header portion of the image data during image capture, and that information needs to be converted based on the distortion correction amount. Further, there may be a plurality of faces that are detected in the face detection processing. In such a case, the above information about each detected face is recorded in the image header portion of the image data during image capture.

Concerning the information of the frame 403 of the face(s) detected in the face detection processing, similar to the above-described AF frame, the coordinates corresponding to the positions in the image of the four vertexes of the square are pre-recorded in the image header portion of the image data during image capture. The coordinates use the center of the image as the origin, as described above. Thus, since the configuration concerning the method for converting the information on the position, size (region), and shape of the face is similar to that for the information on the position, frame size (region), and shape for the above-described AF frame of the face, further description will be omitted here.

Figure 5:
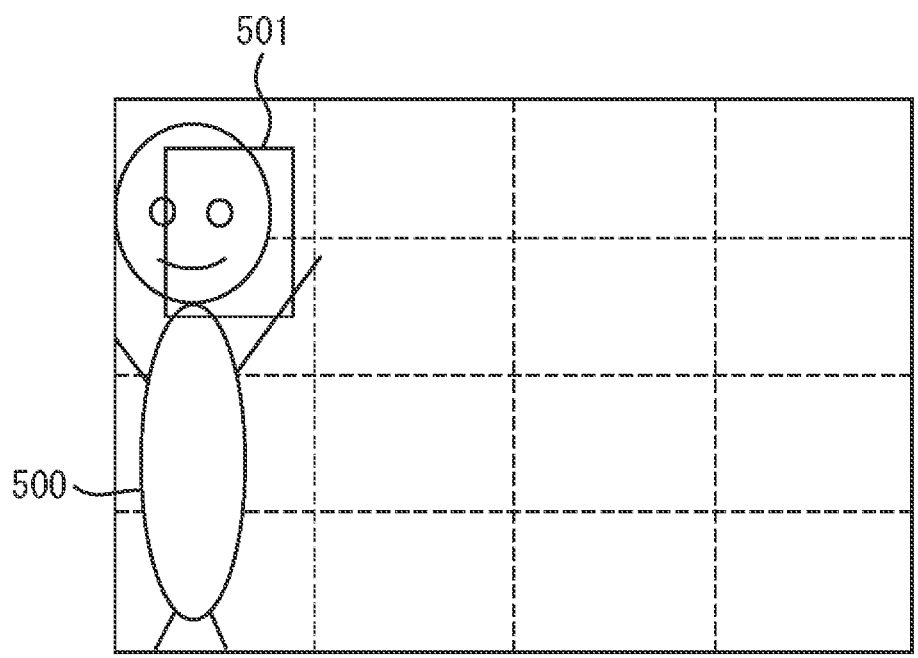
FIG. 5 illustrates an example in which a barrel type distortion image is subjected to distortion correction.

If the coordinates of the face detection frame information recorded in the image header portion of the image data are not converted while performing distortion correction on only the barrel type distortion image 401, the position of the face of a target 500 and the position of a face detection frame 501 become out of alignment as illustrated in FIG. 5. FIG. 5 illustrates an example in which the frame information of the face has coordinates with the center of the image as the origin. If the frame information of the face has coordinates with another point as the origin, the direction in which the position of the face of the target 500 and the position of the face detection frame 501 become out of alignment is different.

Next, a case where the target portion information is the "position, size, and shape of the selected AF frame" (a focused AF frame that is displayed on the display unit) will be described. As described above, only the focused portions from among the plurality of AF frames and plurality of faces detected in the face detection processing may be recorded in the image header portion of the image data and displayed on the image display unit during image playback. Since the method for converting the coordinates of the focused portions in such a case is similar to the above-described conversion method, a description thereof will not be repeated here.

In the present exemplary embodiment, although a method is used in which the focused position is selected from among the plurality of AF frames which can be pre-selected or the position of a face detected in the face detection processing, an automatic method or a method in which an arbitrary position of the image is selected can be used. The method used for converting the coordinates of the focused portion in such a case may be similar to the above-described conversion method.

While a case of barrel type distortion has been described above, the basic configuration is similar in pin-cushion type distortion, and thus a description thereof will not be repeated here.

Referring back to FIG. 2, in step S207, the system control unit 130 once again writes (re-records) the target portion information converted into the above-described distortion correction amount back into the image header portion of the image data. Further, in step S208, the system control unit 130 writes (re-records) that image back into the external storage device 112. Thus, the series of distortion correction processing steps ends.

Further, in the present exemplary embodiment, while a method for performing distortion correction in the imaging apparatus has been described, the present invention is not limited to this. For example, even when the distortion correction is performed by an image processing application software program for a PC (image processing apparatus), the target portion information of the image can be converted based on the distortion correction amount by a similar method as described above.

Further, in the present exemplary embodiment, while processing when performing the distortion correction on an image stored in the external storage device 112 after image capture has been described, the present invention is not limited to this. The distortion correction may also be performed before storing the image into the external storage device 112 during image capture. In such a case, the information converted into target portion information corresponding to the post-distortion correction image using the method described above is recorded in the image header portion.

Figure 7:
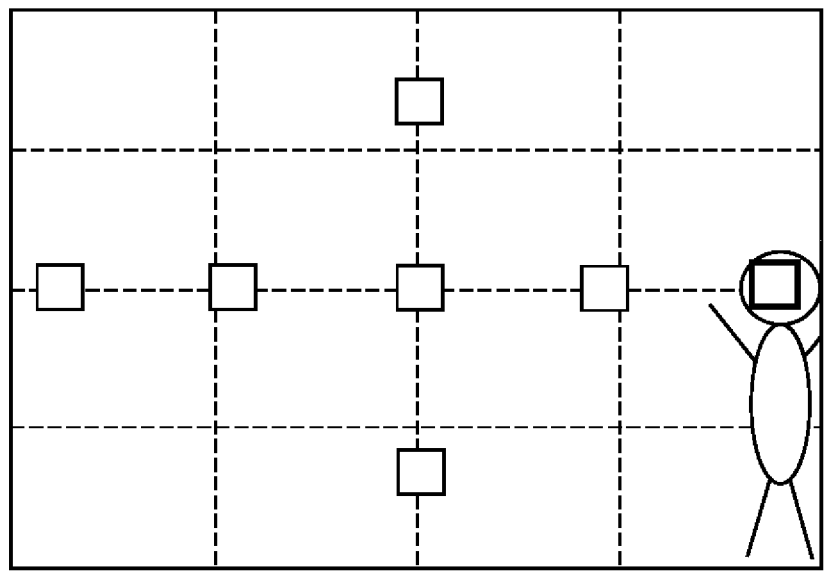
FIG. 7 illustrates an example of display of an AF frame for an image which has undergone distortion correction.
Figure 8:
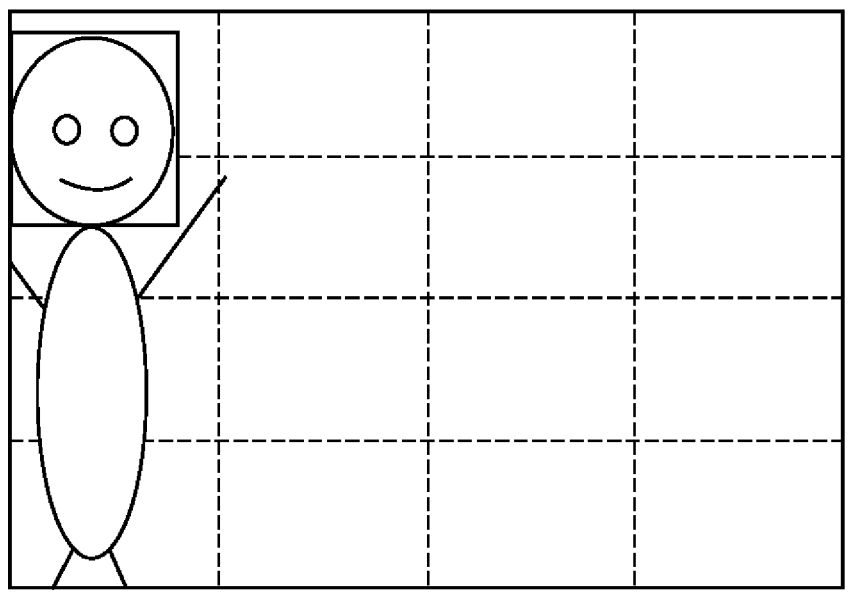
FIG. 8 illustrates an example of display of a face detection frame for an image which has undergone distortion correction.

Next, processing when reading and displaying an image from the external storage device 112 in the imaging apparatus will be described with reference to FIGS. 6 to 8.

Figure 6:
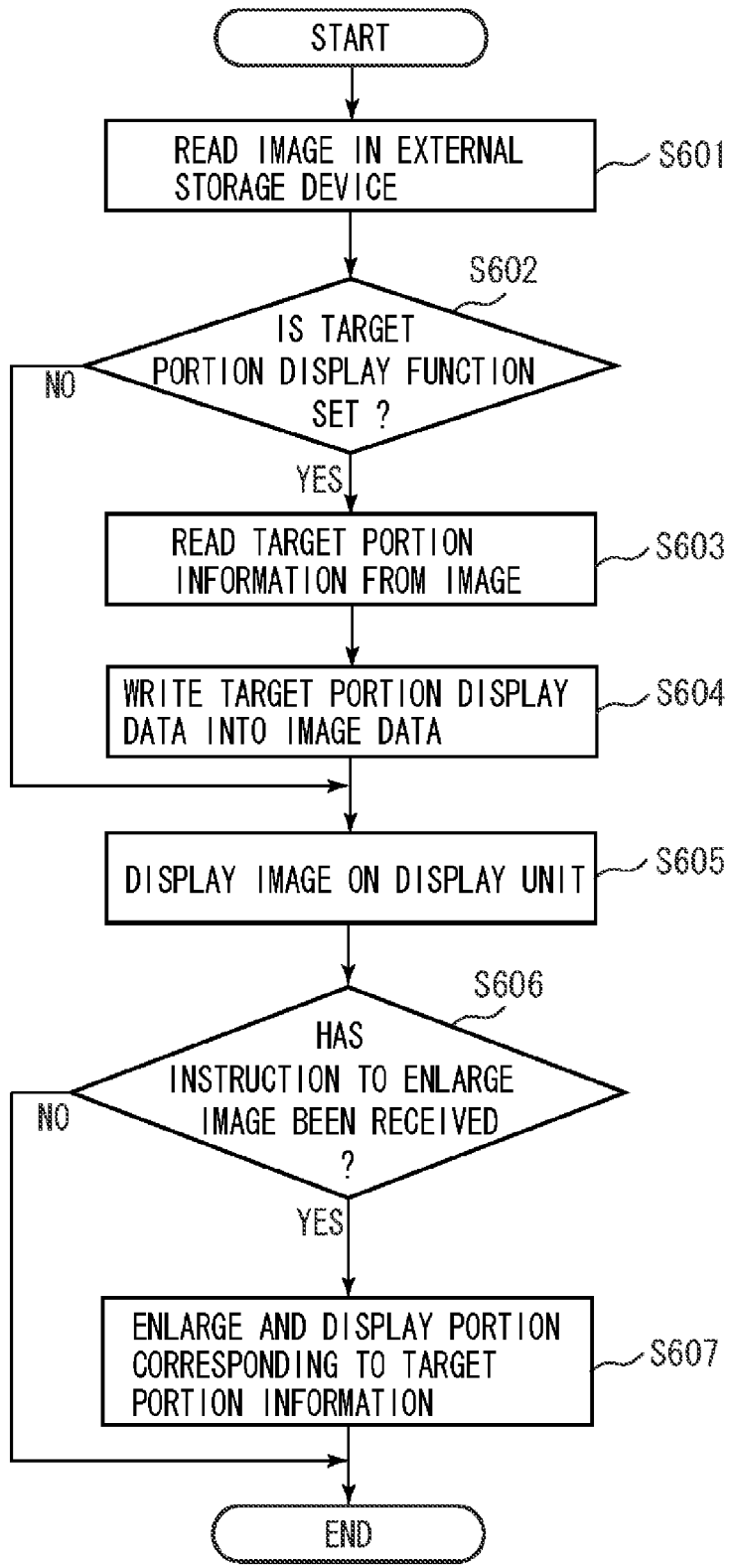
FIG. 6 is a flowchart illustrating a processing flow of reading and displaying of an image in the imaging apparatus from an external storage device.

FIG. 6 is a flowchart illustrating a processing flow of reading and displaying an image in the imaging apparatus from the external storage device 112.

In FIG. 6, first, when an image playback instruction from operation of the operation unit 124 by the operator is received, then in step S601, the system control unit 130 reads an image stored in the external storage device 112 into the image display memory 109. Next, in step S602, the system control unit 130 determines whether a target portion (AF frame) display function is pre-set to ON by the operator.

If the target portion (AF frame) display function is set to ON (YES in step S602), then in step S603, the system control unit 130 reads the target portion information from the image. Conversely, if the target portion (AF frame) display function is set to OFF (NO in step S602), the processing proceeds to step S605. Here, the description for when the target portion (AF frame) display function is set to ON will be continued.

Next, in step S604, the system control unit 130 writes the target portion display data (data indicating the square frame) corresponding to the target portion information read in step S603 into the image content portion of the image data. Then, in step S605, the system control unit 130 displays the image corresponding to the target portion display data on the display unit 107.

In this case, even if distortion correction is performed on the image content portion of the image data, as described above, the target portion information recorded in the image header portion is converted based on the distortion correction amount. Therefore, the correct target portion is displayed on the image, as illustrated in FIGS. 7 and 8. FIG. 7 illustrates an example of display of a target portion for when the image in FIG. 10 is subjected to distortion correction. FIG. 8 illustrates an example of display of the target portion for when the images in FIG. 4 is subjected to distortion correction. If the target portion display function is set to OFF, an image in which the target portion information is not displayed is displayed on the display unit 107.

Next, in step S606, the system control unit 130 determines whether an instruction to enlarge the image currently displayed on the display unit 107 is received by an operation of the operation unit 124 by the operator. If the instruction to enlarge the image is received (YES in step S606), then in step S607, the system control unit 130 enlarges and displays the portion corresponding to the target portion information. Then, the processing ends. Conversely, if the instruction to enlarge the image is not received (NO in step S606), the processing directly ends.

An example of a method for enlarging the portion corresponding to the target portion information of step S607 is to display the position of the focused target portion (AF frame) information as the center. Further, the enlargement ratio of the portion corresponding to the target portion information may be changed based on the size of the target portion information. For example, when a face detected in the face detection processing is recorded as the target portion, the face may be enlarged and displayed to a size that fits on the display unit 107. Alternatively, the image may be displayed at the same size so that the center coordinates of the target portion are in the center of the display unit 107.

If another image is to be displayed in the same manner by the processing illustrated in FIG. 6, the processing can be performed again from step S601.

In the present exemplary embodiment, while a method for displaying the image by the imaging apparatus has been described, the present invention is not limited to this. For example, even when displaying the image by an image processing application software program for a PC (image processing apparatus), the image can be displayed in a similar method as described above.

As described above, according to the present exemplary embodiment, when distortion correction processing is performed on an image captured by the imaging apparatus, the target portion (AF frame) information recorded in the image header portion of the image data is also converted based on the distortion correction amount, and re-recorded in the image header portion. As a result, when an image whose distortion has been corrected is played back and displayed, the correct position can be displayed or enlarged and displayed even when displaying or enlarging and displaying the position of the image target portion (AF frame).

A second exemplary embodiment of the present exemplary embodiment differs from the first exemplary embodiment in the following points. Since other features of the present exemplary embodiment are similar to the corresponding features of the first exemplary embodiment (FIG. 1), a description thereof will not be repeated.

In the present exemplary embodiment, an imaging apparatus will be described in which dust adhered to the image sensor 103 is detected, information about the position, size, and shape of the dust is recorded in the image header portion of the image data, and processing for making dust unnoticeable using image processing with the recorded information is performed.

If distortion correction is performed on an image in a similar manner as in the first exemplary embodiment by an imaging apparatus having such a configuration, the information about the position, size, and shape of the dust recorded in the image header portion of the image data becomes shifted from the actual position, size, and shape of the dust of the image content portion. To resolve this problem, the information about the position, size, and shape of the dust is converted and recorded in the image based on a distortion correction amount performed on the image in a similar manner as in the first exemplary embodiment. An exemplary method for this processing will be described below.

Figure 9:
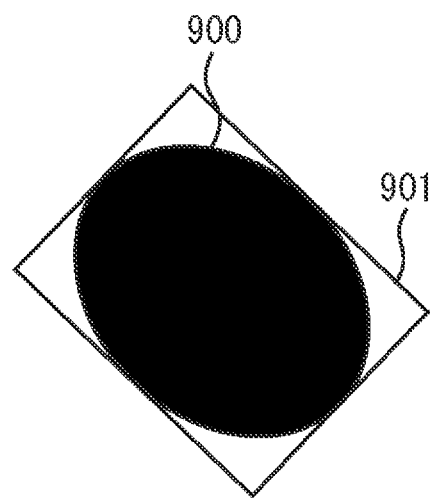
FIG. 9 illustrates an example of a method for defining a dust-adhered region in which dust is adhered on an image sensor of an imaging apparatus serving as an image processing apparatus according to a second exemplary embodiment of the present invention.

First, dust detection processing for detecting dust adhered to the image sensor 103 of the imaging apparatus will be described. A region that is darker than a predetermined brightness in an image obtained by capturing an image of a surface with uniform luminance by the imaging apparatus is determined to be a dust region on which dust is adhered. This dust region is stored in the memory 120. In the present exemplary embodiment, as illustrated in FIG. 9, as a method for defining the dust region, a method is employed in which a quadrangular region enclosing a piece of dust 900 adhered to the image sensor 103 of the imaging apparatus is defined as a dust region 901 in the image.

The coordinates of the four vertexes of the thus-defined dust region 901 in the image are stored in the memory 120 as dust region information. However, the definition method is not limited to this. As long as the information can specify the position, size, shape and the like of the dust in the image, an arbitrary definition method may be used. The dust region information stored in the memory 120 is recorded in the image header portion of the image data during image capture.

Next, the processing when performing the distortion correction on the image will be described. When the distortion correction is performed on the image, the coordinates of the four vertexes of the quadrangle defined as dust region information recorded in the image header portion of the image data are converted in a similar method as used in the first exemplary embodiment for converting the target portion information based on the distortion correction amount. The dust region information thus converted based on the distortion correction amount is again recorded in the image.

Next, the dust erasing processing for making the dust adhered to the image sensor 103 unnoticeable using image processing with the dust region information recorded in the image header portion of the image data will be described. The dust region information is read from the image on which it is desired to perform the dust erasing processing, a pixel that is darker than a predetermined brightness in an image data region corresponding to the dust region is determined to be dust, and the data of that dark pixel is substituted with the data of the pixel which is not detected to be dust closest to the dark pixel. As a result, the dust adhered to the image sensor 103 can be made unnoticeable.

In the present exemplary embodiment, while a simple method such as that described above is given as an example of the dust erasing processing method, the present invention is not limited to this. A dust erasing processing method using a higher degree of processing may also be employed. Further, how the dust adhered to the image sensor 103 appears in the image depends on the conditions of the diaphragm 101. Therefore, to perform more precise dust erasing processing, it is desirable to execute the above-described dust erasing processing on an image in which a surface with uniform luminance is captured beforehand under the same conditions as that of the diaphragm 101 during image capture.

Thus, according to the present exemplary embodiment, dust region information recorded in the image header portion of the image data is converted based on the distortion correction amount performed on the image. As a result, correct dust erasing processing can be performed even when the dust erasing processing is performed on dust in an image whose distortion has been corrected.

The present invention may also be achieved by supplying a storage medium, on which the software program code for realizing the functions of the above exemplary embodiment is stored, to a system or an apparatus, and having a computer (or a central processing unit (CPU) or a micro processing unit (MPU)) of the system or apparatus read the program code stored on the storage medium.

In this case, the program code itself read from the storage medium realizes the functions of the above-described exemplary embodiment, so that the program code and the storage medium storing the program code constitute other embodiments of the present invention.

Examples of storage media for supplying the program code include a floppy disk, a hard disk, a magneto-optical disk, a compact disc read only memory (CD-ROM), a CD recordable (CD-R), a CD-rewritable (CD-RW), a digital versatile disc ROM (DVD-ROM), a DVD random access memory (DVD-RAM), a DVD-RW, a DVD+RW, a magnetic tape, a nonvolatile memory card, a ROM, and the like. Further, the program code may also be downloaded via a network.

Further, the present invention also includes embodiments where the computer executes the read program code, and by that processing the functions of the above-described exemplary embodiment are realized. In addition, the present invention also includes embodiments where, for example, based on an instruction from that program code, an operating system (OS) or the like running on the computer performs part or all of the actual processing, and by that processing the functions of the above-described exemplary embodiment are realized.

Further, the present invention also includes cases where the program code read from a storage medium is written into a memory of a function expansion board inserted into the computer or a function expansion unit connected to the computer. Then, based on an instruction from the program code, a CPU or the like provided on the function expansion board or function expansion unit performs part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-151867 filed Jun. 10, 2008, which is hereby incorporated by reference herein in its entirety.

What is claimed is:

1. An apparatus comprising:
a reading unit configured to read an image and information about a target portion recorded along with the image;
a correction unit configured to correct distortion occurring in the image; and
a recording control unit configured to re-record the information about the target portion which has been changed according to a distortion correction amount performed on the image by the correction unit,
wherein the distortion amount includes at least one of a barrel type distortion correction amount and pin-cushion type distortion correction amount.

2. The apparatus according to claim 1, wherein the information includes information about at least one of a position, size, and shape of the target portion.

3. The apparatus according to claim 1, wherein the target portion includes an autofocus (AF) frame.

4. The apparatus according to claim 1, wherein the target portion includes at least one of a face, eyes, nose, and mouth detected by face detection processing for detecting a predetermined region of a person included in the image.

5. The apparatus according to claim 1, further comprising a display unit configured to display the information about the target portion or to enlarge and display the target portion when displaying the image using the information about the target portion which has been changed according to the distortion correction amount.

6. The apparatus according to claim 1, wherein the target portion includes dust detected by dust detection processing for detecting dust adhered to an image sensor for capturing an image.

7. The apparatus according to claim 6, wherein the correction unit is configured to perform dust erasing processing for making dust adhered to the image sensor unnoticeable using image processing with the information about the target portion which has been changed according to the distortion correction amount.

8. A method comprising:
reading an image and information about a target portion recorded along with the image;
correcting distortion occurring in the image; and
re-recording the information about the target portion which has been changed according to a distortion correction amount performed on the image,
wherein the distortion amount includes at least one of a barrel type distortion correction amount and pin-cushion type distortion correction amount.

9. The method according to claim 8, wherein for the barrel type distortion, a higher image height position of a pixel, a further the pixel moves away from a center of an image sensor and for the pin-cushion type distortion, the higher image height position of the pixel, a closer the pixel moves toward the center of the image sensor.

10. The method according to claim 8, wherein the information includes information about at least one of a position, size, and shape of the target portion.

11. The method according to claim 8, wherein the target portion includes an autofocus (AF) frame.

12. The method according to claim 8, wherein the target portion includes at least one of a face, eyes, nose, and mouth detected by face detection processing for detecting a predetermined region of a person included in the image.

13. The method according to claim 8, further comprising displaying the information about the target portion or to enlarge and display the target portion when displaying the image using the information about the target portion which has been changed according to the distortion correction amount.

14. The method according to claim 8, wherein the target portion includes dust detected by dust detection processing for detecting dust adhered to an image sensor for capturing an image.

15. The method according to claim 14, further comprising performing dust erasing processing for making dust adhered to the image sensor unnoticeable using image processing with the information about the target portion which has been changed according to the distortion correction amount.

16. The apparatus according to claim 1, wherein for the barrel type distortion, a higher image height position of a pixel, a further the pixel moves away from a center of an image sensor and for the pin-cushion type distortion, the higher image height position of the pixel, a closer the pixel moves toward the center of the image sensor.

* * * * *